(12) United States Patent
Fnu et al.

(10) Patent No.: US 7,260,393 B2
(45) Date of Patent: Aug. 21, 2007

(54) SYSTEMS AND METHODS FOR REDUCING COMMUNICATION UNIT SCAN TIME IN WIRELESS NETWORKS

(75) Inventors: Tejaswini Fnu, San Diego, CA (US); Shahrnaz Azizi, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 758 days.

(21) Appl. No.: 10/669,478

(22) Filed: Sep. 23, 2003

(65) Prior Publication Data

US 2005/0063334 A1   Mar. 24, 2005

(51) Int. Cl.
*H04Q 7/20* (2006.01)
(52) U.S. Cl. ................. 455/432.1; 455/434; 455/161.1; 455/166.1
(58) Field of Classification Search ............. 455/67.11, 455/434, 414.1, 452.2, 432.1, 161.1, 166.1; 370/235, 229–237, 395.4, 329–480, 437–462; 709/238–248
See application file for complete search history.

(56) References Cited

U.S. PATENT DOCUMENTS

| | | | | |
|---|---|---|---|---|
| 4,079,452 | A * | 3/1978 | Larson et al. .................. | 710/11 |
| 5,524,278 | A * | 6/1996 | Williams et al. ............. | 455/434 |
| 5,819,171 | A * | 10/1998 | Hoogerwerf et al. ........ | 455/410 |
| 5,950,130 | A * | 9/1999 | Coursey ................... | 455/432.1 |
| 6,160,799 | A | 12/2000 | Krause et al. | |
| 6,807,177 | B2 * | 10/2004 | Henrion .................... | 370/395.1 |
| 7,020,439 | B2 * | 3/2006 | Sinivaara et al. .......... | 455/41.2 |
| 2002/0082010 | A1 * | 6/2002 | Koorapaty et al. ......... | 455/434 |
| 2003/0134642 | A1 | 7/2003 | Kostic et al. | |
| 2004/0090929 | A1 * | 5/2004 | Laux et al. ................. | 370/311 |
| 2004/0137915 | A1 * | 7/2004 | Diener et al. ............ | 455/456.1 |
| 2004/0224631 | A1 * | 11/2004 | Davis et al. ............... | 455/11.1 |
| 2004/0236851 | A1 * | 11/2004 | Kuan et al. ................. | 709/224 |
| 2004/0242149 | A1 * | 12/2004 | Luneau .......................... | 455/1 |
| 2005/0143132 | A1 * | 6/2005 | Proctor et al. .............. | 455/561 |
| 2006/0010264 | A1 * | 1/2006 | Rader et al. .................. | 710/23 |
| 2006/0264201 | A1 * | 11/2006 | Zhang ........................ | 455/411 |

FOREIGN PATENT DOCUMENTS

WO   WO-03/003610 A1   1/2003
WO   WO-2005/032059 A2   4/2005

OTHER PUBLICATIONS

"International Search Report for corresponding PCT Application No. PCT/US2004/031455", (Apr. 11, 2005), 3 pgs.

* cited by examiner

*Primary Examiner*—Joseph Feild
*Assistant Examiner*—Inder Pal Mehra
(74) *Attorney, Agent, or Firm*—Schwegman, Lundberg, Woessner & Kluth, P.A.

(57) ABSTRACT

A communication unit operates in a wireless-networking environment and maintains a mapping for active channels and associated network identifiers. The communication unit may associate with a wireless network using the mapping for one or more of the active channels having a selected network identifier. For associations and reassociations with wireless networks, the communication unit may selectively scan the channels having mapping stored in a table to more quickly identify active channels and thereby reduce scan time. In some embodiments, an access point may perform channel-width measurements and radar detection using the bitmap.

23 Claims, 4 Drawing Sheets

| NETWORK IDENTIFIER (e.g. SSID) | CHANNEL(S) | BITMAP |
|---|---|---|
| SSID #1 | 1, 4 | 0x9 |
| SSID #2 | 2, 4 | 0xa |
| SSID #3 | 10, 12 | 0xa00 |
| SSID #4 | 15 | 0x4000 |
| BLANK (STEALTH MODE) | 16 | 0x8000 |
|  |  |  |
|  |  |  |
|  |  |  |
| SSID #N |  |  |

BITMAP TABLE

FIG. 3

SYSTEMS AND METHODS FOR REDUCING COMMUNICATION UNIT SCAN TIME IN WIRELESS NETWORKS

TECHNICAL FIELD

Embodiments of the present invention pertain to wireless communications and in particular, to communication units that associate with wireless networks.

BACKGROUND

Wireless networks, such as wireless local area networks (WLANS), utilize various operating channels depending on their geographic region. At power up and during their operation, communication units scan channels for their geographic region to determine which channels are active. Channel scans also allow a communication unit to determine network identifiers, such as service set identifiers (SSIDs), associated with the active channels. Scanning is generally performed when a communication unit wishes to associate with (e.g., become part of or join) a wireless network, and when a communication unit wishes to re-associate with a network. Communication units may maintain connectivity with a network by scanning followed by an association and/or reassociation process, if required. Communication units may also perform scans to monitor network changes including the creation of new networks, among other things. As a result, a communication unit may spend a considerable amount of time and resources scanning for active channels.

One problem with channel scanning is that the time it takes (e.g., up to two or more seconds) is fairly significant in a wireless-networking environment where associations and reassociations can occur on a frequent and regular basis. Another problem with channel scanning is that it consumes resources of the communication unit, requiring increased processing and battery capability.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIG. 3 illustrates a bitmap table in accordance with some embodiments of the present invention;

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the fill ambit of the claims and all available equivalents of those claims.

Figure 1:
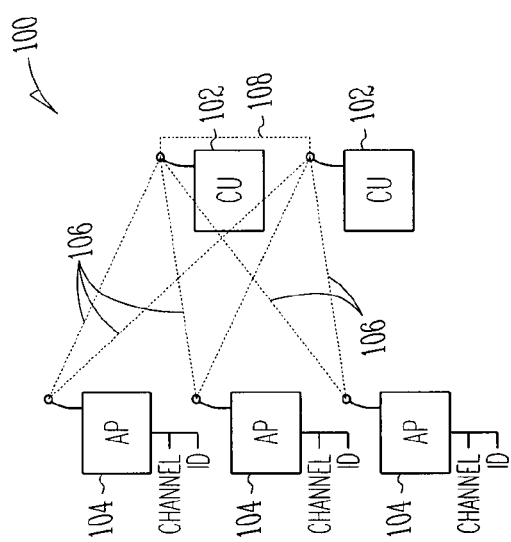
FIG. 1 illustrates an operational environment in which some embodiments of the present invention may be practiced.

FIG. 1 illustrates an operational environment in which some embodiments of the present invention may be practiced. Communication environment 100 may include one or more communication units (CUs) 102, which may communicate with one or more access points (AP) 104 over wireless communication channels 106. Channels 106 may comprise bi-directional communication links. CUs 102 may include, for example, mobile units such as personal digital assistants (PDAs), laptop and portable computers with wireless communication capability, web tablets, wireless telephones, wireless headsets, pagers, instant messaging devices, MP3 players, digital cameras, and other devices that may receive and/or transmit information wirelessly. In some embodiments, CUs 102 may also include access points, although the scope of the invention is not limited in this respect.

In some embodiments, CUs 102 and APs 104 may communicate in accordance with one or more communication standards, such as one of the EEE 802.11(a), (b) or (g) standards, the Digital Video Broadcasting Terrestrial (DVBT) broadcasting standard, and/or the High performance radio Local Area Network (HiperLAN) standard. In other embodiments, CUs 102 may communicate with one or more of APs 104 using a multi-carrier transmission technique, such as an orthogonal frequency division multiplexing (OFDM) technique that uses orthogonal subcarriers to transmit information within an assigned spectrum. Other wireless local area network (LAN) and wireless area network (WAN) communication techniques may also be suitable for communications between communication units 102 and access points 104.

In addition to facilitating communications between CUs 102, in some embodiments, APs 104 may be coupled with one or more networks, such as an intranet or the Internet, allowing CUs 102 to access such networks. Although FIG. 1 illustrates point-to-point communications (e.g., where an access point synchronizes with a network), embodiments of the present invention may also be suitable to point-to-multipoint communications (e.g., peer-to-peer communications in which communication units may share the responsibility for synchronizing with a network). For example, some embodiments of the present invention are applicable to communications between CUs 102 and APs 104 over channels 106 in accordance with a basic service set (BSS) mode. Some embodiments of the present invention, however, are equally applicable to direct communications over links 108 between CUs 102 in an ad-hoc mode. In these embodiments, CUs 102 may use channels of an independent basic service set (IBSS), although the scope of the invention is not limited in this respect. In these embodiments, the IBSS channels may be a subset of the channels that are valid for a particular geographic region, although the scope of the invention is not limited in this respect.

In order to associate with a network through one of APs 104, conventional communication units may scan all channels for their geographic region to determine which channels are active and to determine network identifiers (e.g., SSIDs) associated with the active channels. This scanning is generally performed each time a communication unit wishes to associate with (e.g., become part of or join) a wireless network, and each time the communication unit wishes to re-associate with a network. As mentioned earlier, a problem with such channel scanning is that it takes time (e.g., up to two or more seconds), which is significant in a wireless-networking environment where associations and re-associations may occur on a frequent and regular basis. Furthermore, the operating system as well as other wireless LAN applications may request the communication unit to perform periodic-comprehensive scans. Since these periodic-comprehensive scans may be performed fairly often (e.g., approximately once a minute), they can adversely affect the throughput and/or performance of the communication unit, and even disrupt higher-layer protocols such as the file-transfer protocol (FTP).

In accordance with some embodiments of the present invention, a communication unit, such as one of CUs 102, may reduce scan/association time by maintaining a single bitmap one or more active channels associated with a single network identifier. The communication unit may associate and/or reassociate with a wireless network using network-interface circuitry and the bitmap for one or more of the active channels associated with a selected network identifier. In some embodiments, communication units 102 may further reduce scan time by engaging in mixed mode scanning. In these embodiments, active scans may be performed for some predetermined channels, and passive scans may be performed for some other channels. Active and passive scans, in accordance with some embodiments of the present invention, are described in more detail below.

Although some embodiments of the present invention are described and illustrated for a mobile-communication unit, the scope of the present invention is not limited in this respect. Embodiments of the present invention are also applicable to access points which may perform neighborhood discovery, radar detection, and channel-width selection (e.g., per revisions of some IEEE 802.11 standards), among other things. As used herein and in the claims, the term "bitmap" may include any type of mapping including a bitmap, an array, a linked list, a hash table, etc.

Figure 2:
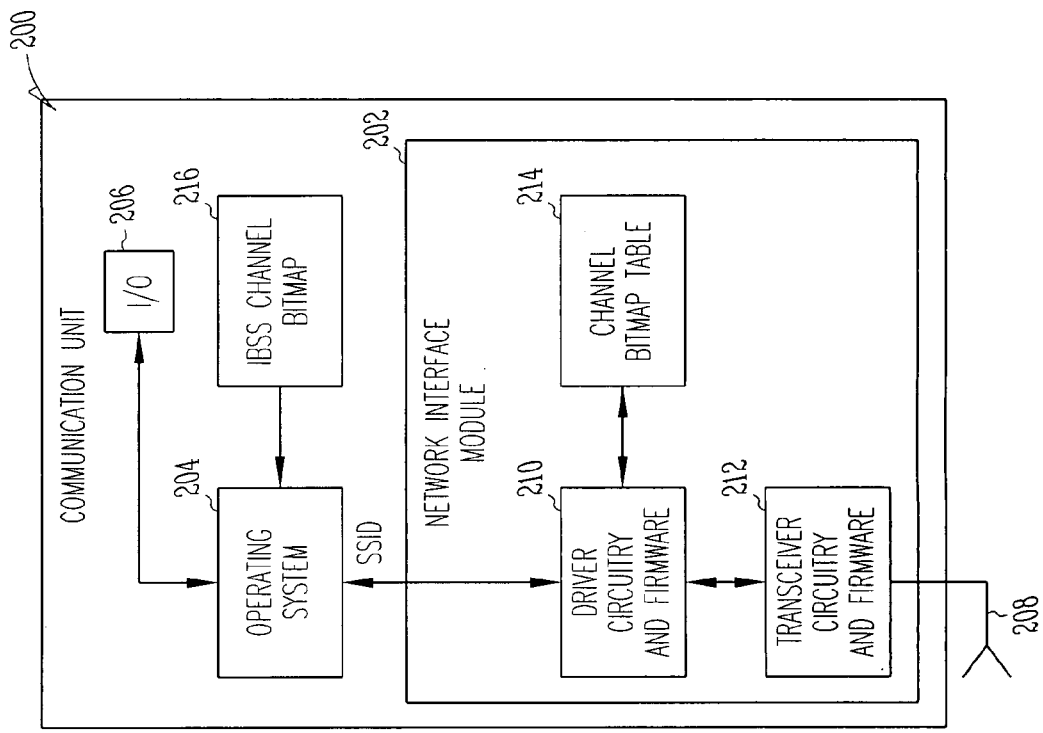
FIG. 2 is a block diagram of a communication unit in accordance with some embodiments of the present invention.

FIG. 2 is a block diagram of a communication unit in accordance with some embodiments of the present invention. Communication unit (CU) 200 may be suitable for use as one or more of CUs 102 (FIG. 1) and/or AP 104 (FIG. 1) although other communication devices may also be suitable for use. CU 200 may include network-interface module 202, operating system 204 and I/O 206, as well as other hardware and software elements that allow the communication unit to serve its primary purpose.

In some embodiments, network-interface module 202 may include transceiver circuitry and firmware 212 for receiving and/or transmitting radio frequency (RF) communications with antenna 208. RF signals received from antenna 208 may be down-converted to baseband signals and baseband signals may be up-converted for transmission by antenna 208. Network-interface module 202 may also include baseband circuitry (not separately illustrated) to convert between baseband signals and data signals that may be used by data processing circuitry and operating system 204. In accordance with some embodiments of the present invention, interface 202 may detect packets and synchronize to symbol boundaries and may use a sequence of training symbols having a set of known characteristics. Antenna 208 may comprise a directional or omnidirectional antenna, including, for example, a dipole antenna, a monopole antenna, a loop antenna, a microstrip antenna or other type of antenna suitable for reception and/or transmission of RF signals that may be processed by CU 200.

In accordance with some embodiments of the present invention, network-interface module 202 may also include driver circuitry and firmware 210 which may maintain a bitmap for active channels and their associated network identifiers. Transceiver circuitry and firmware 212 may responsively tune to one or more of the active channels using the bitmap for the one or more active channels to allow the communication unit to either associate or reassociate with a wireless network having a selected network identifier.

In accordance with some embodiments, CU 200 may initially scan for active channels to determine network identifiers associated with one or more active channels and to generate bitmaps for the active channels. The bitmaps may be stored in channel-bitmap table 214. Table 214 may associate the bitmaps and network identifiers for the active channels. In some embodiments, driver circuitry and firmware 210 may generate and maintain the bitmaps in table 214, and it may provide a bitmap to transceiver circuitry and firmware 212 for tuning to one or more channels in response to receipt of a network identifier (e.g., an SSID) from operating system 204.

In some embodiments, CU 200 may scan predetermined or selected channels to identify network identifiers associated with the predetermined channels that are active, and CU 200 may generate a bitmap for the active channels and their associated network identifiers. In some embodiments, the predetermined channels may be predetermined for a geographic location of the communication unit.

Communication unit 200 may associate with a wireless network by sending an association request on a channel having a selected network identifier through an access point. The selected network may authenticate the communication unit in response to a prior authentication request. As part of associating or reassociating, operating system 204 may provide a selected or predetermined network identifier to network-interface module 202, and driver circuitry and firmware 210 may retrieve a bitmap for the one or more channels associated with the network identifier. The retrieved bitmap may be provided to firmware of transceiver circuitry and firmware 212 to tune to the one or more channels for sending the association/reassociation request. Transceiver circuitry and firmware 212 may send the association/reassociation request to an access point, such as one of APs 104 (FIG. 1) over a wireless link, such as one of channels 106 (FIG. 1), using an antenna, such as antenna 208. In some embodiments, the network identifiers comprise service set identifiers (SSIDs), although the scope of the invention is not limited in this respect.

In some embodiments, the scanning performed by CU 200 may comprise passive scanning. Passive scanning may include for some embodiments, waiting at least a predetermined period of time for possible receipt of a beacon frame and/or a probe-response frame directed to another communication unit in response to a previously transmitted probe request from that other communication unit. The beacon frame may be broadcast by an access point on an active channel and may include the network identifier associated with the channel. In some embodiments, access points may send beacon frames on a particular channel on a regular basis (e.g., once every 100 ms or so) as part of their communications with communication units. In general, a beacon frame identifies the network associated with the channel it is being broadcast on, as well as other network-related information. In accordance with some embodiments, CU 200 may build bitmaps for these active channels using the information in the beacon frame. The use of these internally stored bitmaps generated by passive scanning may reduce scan time, which in turn may reduce the total association and/or reassociation time, since subsequent scans for association may be restricted to those channels that are present in the bitmap.

In some embodiments of the present invention, the scanning performed by CU 200 may comprise active scanning. Active scanning may include, for predetermined channels, transmitting a probe request on at least one of the predetermined channels. The channels may be predetermined for a particular geographic region in which the communication unit is set up to operate. When a probed channel is active, the communication unit may receive a probe response from an access point providing the channel. The probe response may include the network identifier associated with an active channel. In these embodiments, CU 200 may build bitmaps for these active channels using the information in the probe response.

In some embodiments, the probe requests may comprise a probe-request frame or message, and the probe response may comprise a probe-response frame or message. In some embodiments, CU 200 may transmit a probe request and wait for a probe response sequentially on each of the predetermined channels. The use of these internally stored bitmaps generated by active scanning may reduce scan time, which in turn may reduce the total association and/or reassociation time.

In some embodiments, the predetermined channels may have subset of channels which may be referred to as independent basic service set (IBSS) channels for a geographic location of the communication unit. In these embodiments, channel bitmaps for these channels may be stored in IBSS channel-bitmap table 216. A communication unit configured in BSS mode may perform active scanning in the IBSS channels even when these channels are not active (e.g., are used by a network). In a mixed-mode scanning embodiment, CU 200 may perform both passive and active scanning, which may further reduce scan time, and which in turn may reduce the total association and/or reassociation time. Furthermore, run-time latencies may be reduced due to periodic-comprehensive scans. It should be noted that mixed-mode scans using an IBSS channel set in BSS mode may be particularly useful for runtime comprehensive scans because a communication unit may scan valid channels irrespective of the SSID.

In some embodiments, I/O 206 may be configured to allow a user to select a network. In these embodiments, the user may select a network by inputting a network name, network identifier (such as an SSID), or other network description. In these embodiments, operating system 204 may determine the network identifier and provide it to interface circuitry 202 for association with the network using the bitmap from table 214 for the network identifier.

Although CU 200 is illustrated as a wireless communication device, CU 200 may be almost any wireless or wireline communication device, including a general purpose processing or computing system. In some embodiments, CU 200 may be a battery-powered device. In some of these embodiments, CU 200 may not require an external antenna. Although CU 200 is illustrated as having several separate functional elements, one or more of the functional elements may be combined and may be implemented by combinations of software-configured elements, such as processing elements including digital signal processors (DSPs), and/or other hardware elements. For example, operating system 204 as well as other elements of CU 200 may be implemented by processing elements, which may comprise one or more microprocessors, DSPs, application specific integrated circuits (ASICs), and combinations of various hardware and logic circuitry for performing at least the functions described herein.

FIG. 3 illustrates a bitmap table in accordance with some embodiments of the present invention. Bitmap table 300 may be generated by a communication unit, such as one or more of CUs 102 (FIG. 1) and/or CU 200 (FIG. 2). In some embodiments, bitmap table 300 may be generated by an access point, such as AP 104 (FIG. 1). In some embodiments, bitmap table 300 may be generated by driver circuitry, such as driver circuitry and firmware 210 (FIG. 2) and stored as channel-bitmap table 214 (FIG. 2), although the scope of the invention is not limited in this respect. Although bitmap table 300 is illustrated as a table, those skilled in the art will appreciate that the information may be stored in other data structures, such as hash tables.

Bitmap table 300 may include column 302 comprising network identifiers, column 304 comprising one or more channels corresponding to the network identifier of column 302, and column 306 comprising a bitmap generated for the one or more channels of column 304. As illustrated in table 300, channel scanning by a communication unit may have identified SSID #1 on channels 1 and 4, resulting in the generation of a bitmap, such as bitmap "0x9". The particular bitmap may depend on the valid channel set for the geographic region for which table 300 is being generated for. For example, when the valid channel set is comprised of channels 1 through 10 and SSID #1 were present on channels 1 and 4, the resulting bitmap may be "0x9" depending on the valid channel set. This particular bitmap may allow the transceiver circuitry to tune to channels 1 and 4 when provided by the driver circuitry. As also illustrated in table 300, a channel scan may have identified SSID #2 on channels 2 and 4 resulting in the generation of a bitmap, such as bitmap "0xa". This particular bitmap may allow the transceiver circuitry to tune to channels 2 and 4 when provided by the driver circuitry.

In accordance with some embodiments, a transceiver, such as transceiver circuitry and firmware 212 (FIG. 2), tunes to the channels in a serial manner. A scan implementation layer of a media access controller (e.g., a MAC) may control the duration of dwell time per channel. For example if the scan was implemented in firmware and the channel bitmap was being maintained in a driver, the driver may send a "scan command" to firmware along with the bitmap of the channels to scan. The firmware may then start a loop to scan through these channels, one at a time. In these embodiments, the transceiver may be tuned to a specific channel for a certain duration, which may depend on the protocol and may be implementation specific. At the end of this duration, the firmware may tune the transceiver to the next channel in the bitmap and may repeat the process. An example of a procedure for performing periodic-comprehensive scans is illustrated below in FIG. 4.

A communication unit may perform association scans and/or runtime periodic-comprehensive scans. In accordance with embodiments of the present invention, scan time may be reduced in association scans at least because of the channel bitmaps based on SSIDs generated with the help of periodic-comprehensive scans. In some embodiments, these SSID-based channel bitmaps may restrict an association scan to the channels enabled in the bitmap. The communication unit may perform active scans on the channels present in the bitmap. In a periodic-comprehensive scan, the scan time may be reduced at least because of mixed mode scanning. The communication unit may use the IBSS channels bitmap even when the unit is configured for BSS mode and may actively scan the IBSS channels. On the remaining channels, the communication unit may perform active and/or passive scans. When the IBSS channel bitmap is not used, the communication unit may have performed passive scans on the IBSS channel when there was no wireless LAN activity in those channels. This is further illustrated below in FIG. 4.

In some embodiments, bitmaps may be generated for access points that are configured in a stealth mode. In stealth mode, the access point does not include a network identifier (e.g., an SSID) in its beacons or beacon frames. In these embodiments, a communication unit may construct a channel bitmap for channels on which beacons with missing identifiers are received. These bitmaps may also be maintained in the driver circuitry or firmware and may be used in subsequent association and/or reassociation attempts by a communication unit.

In some embodiments, a communication unit may regularly maintain and update bitmap table 300 by performing periodic maintenance scans. As a result of a periodic maintenance scan, a bit map corresponding to a channel for a certain access point or network identifier may be disabled if signals are not received by the access point during a predetermined number of such periodic scans or after a predetermined period of time.

Figure 4:
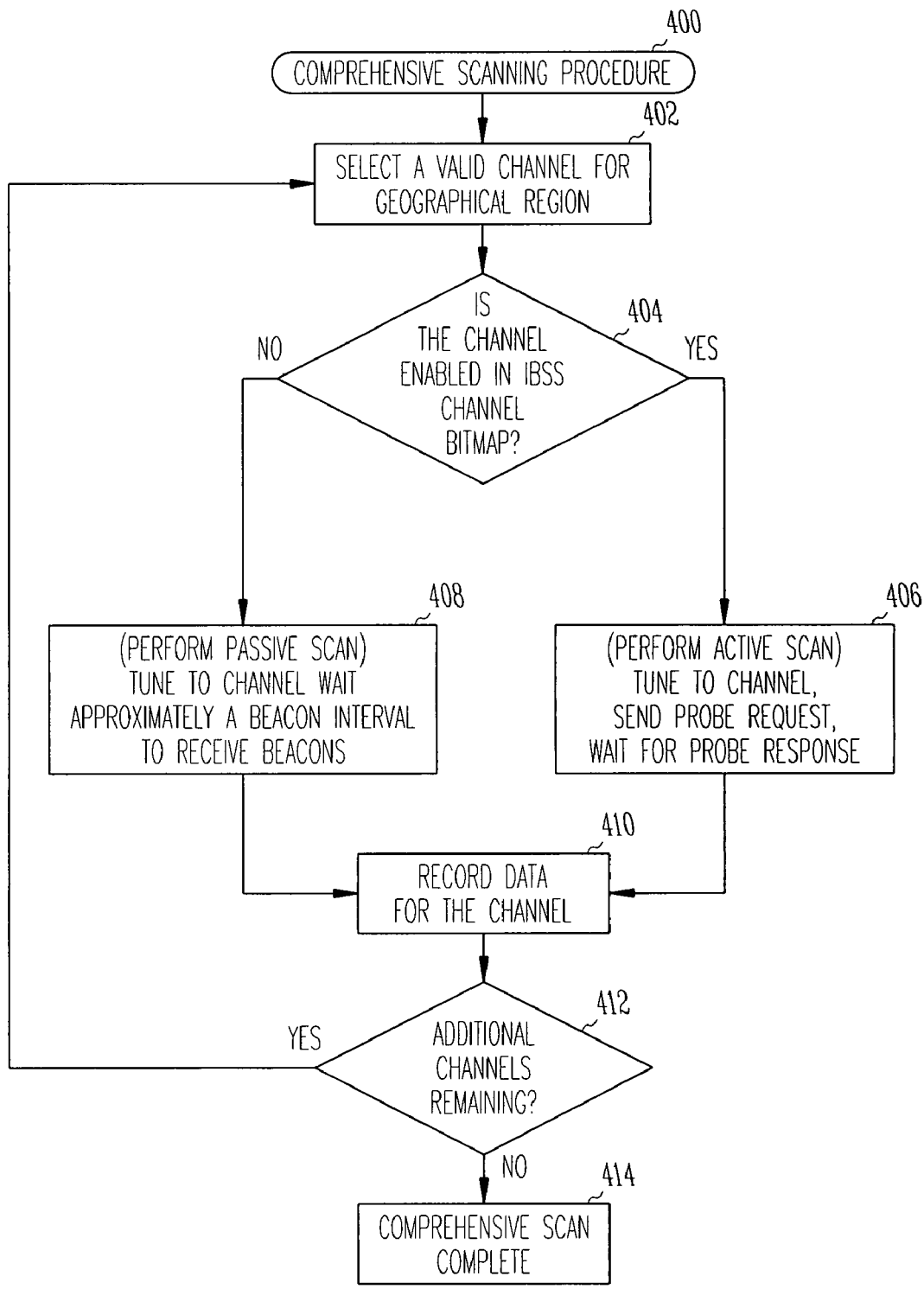
FIG. 4 is a flow chart of a comprehensive scanning procedure in accordance with some embodiments of the present invention.

FIG. 4 is a flow chart of a comprehensive scanning procedure in accordance with some embodiments of the present invention. Procedure 400 may be performed by a communication unit, such as one or more of CUs 102 (FIG. 1) or CU 200 (FIG. 2), although other communication units may also be used to perform procedure 400. In some embodiments, procedure 400 may be performed by an access point, such as AP 104 (FIG. 1).

Operation 402 selects a valid channel set for the geographic region where the communication unit resides. In some embodiments, the communication unit may use an internal global-positioning receiver to identify the geographic region. The channels valid for various geographic regions may be stored in memory of the communication unit. In some embodiments, operation 402 may select a first channel of a set of channels that are valid for the geographic region, and operations 404 through 410 may be performed for the selected channel.

Operation 404 determines whether the selected channel is enabled in the IBSS channel bitmap. When the channel is enabled, operation 406 may be performed which includes performing an active scan. When the channel is not enabled in the IBSS channel bitmap, operation 408 may be performed which includes performing a passive scan.

For example, valid channels for a particular geographic region may comprise channels 1 through 7 and IBSS channels may be a subset of the valid channels and may comprise channels 2, 4 and 6. The IBSS channel bitmap may be 0x2A, which may be based on channels 1 through 7 being active and channels 2, 4 and 6 being selected by the bitmap for tuning.

In operation 406, the communication unit may perform an active scan on the selected channel. The active scan may include tuning to the selected channel, sending a probe request, and waiting for a probe response. Operation 406 allows the communication unit configured to work in BSS mode to take advantage of the IBSS bitmap for the periodic-comprehensive scans. Operation 406 may also allow the communication unit to perform active scans on the IBSS channels even though the IBSS channels may not be active.

In operation 408, the communication unit may perform a passive scan on the selected channel. The passive scan may include tuning to the selected channel and waiting for at least approximately a beacon interval to receive beacons. If a beacon is not received within a predetermined period of time, operation 402 may be repeated for a next channel. Upon completion of operation 408, the communication unit may repeat operation 402 for other channels.

In operation 410, the data received in either operation 408 or 410 may be recorded for the selected channel. The data may include one or more SSIDs and other data about the access point or wireless network.

Operation 412 determines if there are additional channels remaining for the geographic region. When there are additional channels, operations 402 through 410 may be repeated for the remaining channels. When there are no more additional channels, operation 414 may be performed which ends the periodic-comprehensive scan of procedure 400.

Figure 5:
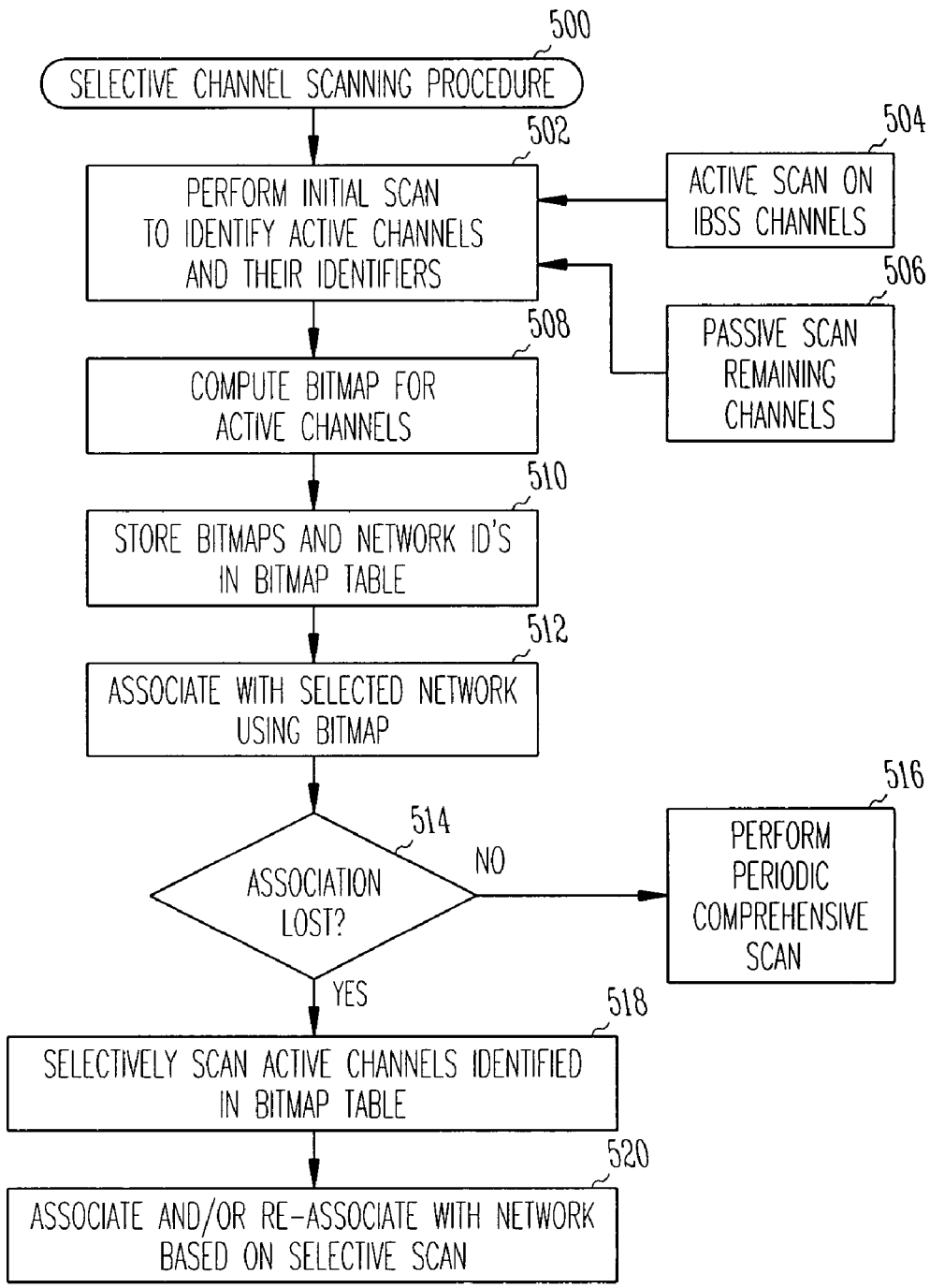
FIG. 5 is a flow chart of a selective channel scanning procedure in accordance with some embodiments of the present invention.

FIG. 5 is a flow chart of a selective channel scanning procedure in accordance with some embodiments of the present invention. Selective channel scanning procedure 500 may be performed by a communication unit, such as one or more of CUs 102 (FIG. 1) or CU 200 (FIG. 2), although other communication units may also be used to perform procedure 500. In some embodiments, procedure 500 may be performed by an access point, such as AP 104 (FIG. 1).

In operation 502, a communication unit may perform an initial scan to identify active channels and, in many cases, their network identifiers. The initial scan may be a comprehensive scan, such as the periodic-comprehensive scan described in procedure 400 (FIG. 4) to identify all active channels. In some embodiments, the communication unit may perform passive scans on certain channels, while in other embodiments (e.g., mixed-mode embodiments) the communication unit may perform an active scan (e.g., operation 504) on certain channels and a passive scan (e.g., operation 506) on other or remaining channels.

In operation 508, a communication unit may generate a bitmap for the active channels identified in operations 502-506. In some embodiments, a single bitmap may be computed for one or more channels having the same network identifier.

In operation 510, the bitmaps generated for the one or more active channels and their associated network identifiers (e.g., SSIDs) may be stored in a bitmap table, such as table 300 (FIG. 3). In some embodiments, operations 502 through 510 may be performed sequentially for each channel being scanned, or sequentially for each active channel identified, although the scope of the invention is not limited in this respect.

In operation 512, the communication unit may associate with a network using the channel bitmap for a channel having the network's identifier. The network may be predetermined, preprogrammed into the communication unit, or selected by a user. In some embodiments, the particular network may be selected by the communication unit based on a preprogrammed set of guidelines based on, for example, cost of service, quality of service, security, and/or bandwidth of the network connection.

Operation 514 determines if the association with a network has been lost. When the association has not been lost, operation 516 may be performed in which the communication unit may wait until it is time to perform a periodic-comprehensive scan, such as the periodic-comprehensive scan of procedure 400 (FIG. 4).

When operation 514 determines that the association has been lost, operation 518 may be performed. In some embodiments, operation 518 may be performed when the communication unit determines that association has been lost while waiting to perform a periodic-comprehensive scan, rather than performing the periodic-comprehensive scan.

In operation 518, the communication unit may selectively scan for active channels identified in the bitmap table. In some embodiments, the communication unit may first selectively scan for active channels identified in the bitmap table having selected or predetermined network identifiers, and if no such active channels are identified, the communication unit may then scan the other channels identified as valid channels for the geographic region. In some embodiments, operation 518 may include periodic maintenance scans. In some embodiments, operation 518 may include active scans (e.g., operation 504) as well as passive scans (e.g., operation 506).

In operation 520, the communication unit may associate and/or reassociate with a network based on the selective scanning performed in operation 518. In some embodiments, the operating system of the communication unit may provide a network identifier, such as an SSID, to the network-interface circuitry and the driver circuitry may responsively provide the corresponding bitmap to the transceiver circuitry for tuning to the one or more channels corresponding to the bitmap.

Operations 518 and 520 may be performed on a regular basis by a communication unit as the communication unit changes location and engages in communications with one or more access points. Through the use of selective scanning, the amount of time and resources required may be reduced.

Although the individual operations of procedures 400 and 500 are illustrated and described as separate operations, one or more of the individual operations may be performed concurrently, and nothing requires that the operations be performed in the order illustrated.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waver, infrared signals, digital signals, etc.), and others.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A method comprising:
   maintaining a single mapping for one or more active channels associated with a single network identifier;
   associating with a wireless network using the mapping for one of the active channels associated with a selected network identifier,
   wherein the method is performed by a communication unit to reduce scan time in a wireless local area network, and wherein the maintaining the mapping is performed by one of driver circuitry, firmware and network-interface circuitry,
   wherein the associating is performed by network-interface circuitry tuning to the one of the active channels in response to the mapping, the mapping comprising one of either a bitmap, an array, a linked list, or a hash table, and
   wherein the network-interface circuitry to determine the mapping based on the network identifier provided by an operating system.

2. The method of claim 1 further comprising scanning to determine network identifiers associated with the one or more active channels, and wherein the maintaining comprises:
   generating one or more single bitmaps for the one or more active channels associated with single network identifiers; and
   storing the bitmaps in a bitmap table, and
   wherein to either associate or reassociate, the method comprises:
   scanning the one or more active channels identified in the bitmap table; and
   refraining from scanning for channels not identified in the bitmap table to reduce scan time.

3. The method of claim 1 further comprising:
   scanning predetermined channels to identify network identifiers associated with active of the predetermined channels; and
   generating a bitmap for the active channels and their associated network identifiers,
   wherein the predetermined channels are predetermined for a geographic location.

4. The method of claim 1 wherein the associating comprises sending an association request on a channel associated with a selected network identifier through an access point, wherein a network associated with the selected network identifier authenticates the communication unit in response to the association request.

5. The method of claim 4 wherein the associating further comprises:
   sending the selected network identifier to the network-interface circuitry;
   retrieving the bitmap associated with the selected network identifier by the driver circuitry;
   tuning, in response to the bitmap, to a channel for sending the association request; and
   sending the association request to the access point over a wireless link using an antenna.

6. The method of claim 1 further comprising passively scanning channels, and waiting for receipt of a beacon frame, the beacon frame including the network identifier associated with one of the scanned channels.

7. The method of claim 6 wherein the scanning further comprising active scanning and includes for predetermined channels,
   transmitting a probe request on at least one of the predetermined channels; and waiting to receive a probe response from an access point, the probe response including the network identifier associated with an active channel.

8. A method comprising:
maintaining a single mapping for one or more active channels associated with a single network identifier;
passively scanning channels by waiting for receipt of a beacon frame, the beacon frame including the network identifier associated with one of the passively scanned channels,
actively scanning predetermined channels by transmitting a probe request on at least one of the predetermined channels and waiting to receive a probe response from an access point, the probe response including the network identifier associated with an active channel,
wherein the predetermined channels are independent basic service set channels for a geographic location.

9. The method of claim 8 passively scanning channels further comprises receiving a probe response directed to another communication unit on one of the channels, the probe response including the network identifier associated with an active channel.

10. The method of claim 8 further comprising repeating the transmitting the probe request sequentially for other channels of the independent basic service set to determine network identifiers for active channels of the independent basic service set.

11. A mobile communication unit that scans channels of wireless networks with a reduced scan time comprising:
network-interface circuitry to maintain a single mapping for one or more active channels associated with a single network identifier; and
transceiver circuitry to tune to one of the active channels using the mapping to allow the communication unit to either associate or reassociate with a wireless network having the associated network identifier,
wherein the mapping comprises one of either a bitmap, an array, a linked list, or a hash table, and
wherein to either associate or reassociate, the transceiver circuitry scans the one or more active channels identified in the bitmap table, and refrains from scanning channels not identified in the bitmap table to reduce scan time.

12. A communication unit comprising:
network-interface circuitry to maintain a single mapping for one or more active channels associated with a single network identifier; and
transceiver circuitry to tune to one of the active channels using the mapping to allow the communication unit to either associate or reassociate with a wireless network having the associated network identifier,
wherein the mapping comprises one of a bitmap, an array, a linked list, or a hash table,
wherein the network-interface circuitry includes driver circuitry to maintain a bitmap table for the active channels, and
wherein the driver circuitry to generate bitmaps for the active channels and to store the bitmaps in the bitmap table, the bitmap table to associate the bitmaps and network identifiers for the active channels.

13. A communication unit comprising:
network-interface circuitry to maintain a single mapping for one or more active channels associated with a single network identifier;
transceiver circuitry to tune to one of the active channels using the mapping to allow the communication unit to either associate or reassociate with a wireless network having the associated network identifier; and
an operating system,
wherein the mapping comprises one of either a bitmap, an array, a linked list, or a hash table, and
wherein the operating system in conjunction with the network-interface circuitry to scan predetermined channels to identify network identifiers associated with active of the predetermined channels, and the driver circuitry to generate single bitmaps for one or more active channels and their associated network identifiers.

14. The communication unit of claim 13 wherein as part of associating, the transceiver circuitry to send an association request on a channel associated with a selected network identifier through an access point, wherein a network associated with the selected network identifier to authenticate the communication unit in response to the association request.

15. The communication unit of claim 14 wherein the operating system to send a selected network identifier to the network-interface circuitry, and the network-interface circuitry to retrieve the bitmap associated with the network identifier and to provide the bitmap to the transceiver circuitry, and the transceiver circuitry to tune to a channel for sending the association request and to send the association request to the access point over a wireless link using an antenna.

16. The communication unit of claim 13 wherein the operating system in conjunction with the network-interface circuitry to passively scan channels by waiting for receipt of a beacon frame, the beacon frame including the network identifier associated with a channel, and
wherein the communication unit is to receive a probe response directed to another communication device while waiting for the beacon frame.

17. The communication unit of claim 16 wherein the operating system in conjunction with the network-interface circuitry to perform an active scan of predetermined channels, the active scan to include a transmission of a probe request on at least one of the predetermined channels, and to wait to receive a probe-response frame from an access point, the probe response to include the network identifier associated with an active channel, the probe-response frame to be directed either to the communication unit or another communication unit.

18. A system comprising:
an omnidirectional antenna to communicate with an access point;
network-interface circuitry to maintain a mapping for active channels and associated network identifiers; and
transceiver circuitry coupled to the antenna to tune to one of the active channels using the mapping for the active channel to allow either an association or a reassociation with a wireless network having a selected network identifier,
wherein the mapping comprises one of a bitmap, an array, a linked list, or a hash table,
wherein the network-interface circuitry includes driver circuitry to maintain a bitmap table for the active channels, wherein the driver circuitry to generate the bitmaps for the active channels and to store the bitmaps in the bitmap table, the table associating the bitmaps and network identifiers for the active channels, and
wherein to either associate or reassociate with the wireless network, the transceiver circuitry scans the one or more active channels identified in the bitmap table, and refrains from scanning channels not identified in the bitmap table to reduce scan time.

19. The system of claim 18 further comprising an operating system, wherein the operating system in conjunction with the network-interface circuitry scans predetermined channels to identify network identifiers associated with active of the predetermined channels, and wherein the driver circuitry to generate a bitmap for the active channels and an associated network identifier.

20. A computer-readable medium that provides instructions, which when executed by one or more processors, cause said set of processors to perform operations comprising reducing scan time in a wireless-networking environment and include maintaining a single bitmap in a bitmap table for one or more active channels associated with a single network identifier and another bitmap based on predetermined channels, wherein to either associate or reassociate, the operations further comprise instructing a transceiver to scan the one or more active channels identified in the bitmap table, and to refrain from scanning for channels not identified in the bitmap table to reduce scan time.

21. A computer-readable medium of claim 20 wherein the instructions, when further executed by the one or more processors, perform operations further comprising associating with a wireless network using the bitmap for one of the active channels associated with a selected network identifier.

22. A computer-readable medium of claim 21 wherein the instructions, when further executed by the one or more processors, perform operations further comprising:

scanning for active channels to determine network identifiers associated with the active channels:

generating the bitmaps for the active channels; and storing the bitmaps in a the bitmap table, the table associating the bitmaps and network identifiers for the active channels.

23. A computer-readable medium of claim 22 wherein the instructions, when further executed by the one or more processors perform operations further comprising sending an association request on a channel associated with a selected network identifier through an access point, wherein a network associated with the selected network identifier authenticates a communication unit in response to the association request.

* * * * *

UNITED STATES PATENT AND TRADEMARK OFFICE
CERTIFICATE OF CORRECTION

PATENT NO. : 7,260,393 B2
APPLICATION NO. : 10/669478
DATED : August 21, 2007
INVENTOR(S) : Fnu et al.

It is certified that error appears in the above-identified patent and that said Letters Patent is hereby corrected as shown below:

In column 14, line 10, in Claim 22, after "bitmaps in" delete "a".

Signed and Sealed this

Twentieth Day of November, 2007

JON W. DUDAS
*Director of the United States Patent and Trademark Office*